(12) United States Patent
Reeves et al.

(10) Patent No.: US 9,008,666 B1
(45) Date of Patent: Apr. 14, 2015

(54) WIRELESS COMMUNICATION SYSTEM FOR DORMANT MODE DURING OFF-NETWORK TRANSIT

(71) Applicant: Sprint Communications Company L.P., Overland Park, KS (US)

(72) Inventors: Raymond Emilio Reeves, Oviedo, FL (US); Michael Aaron Silvey, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/058,958

(22) Filed: Oct. 21, 2013

(51) Int. Cl.
*H04W 36/00* (2009.01)

(52) U.S. Cl.
CPC ................................ *H04W 36/0072* (2013.01)

(58) Field of Classification Search
USPC ........ 455/552.1, 441, 440; 370/332, 338, 342
See application file for complete search history.

(56) References Cited

U.S. PATENT DOCUMENTS

| | | | |
|---|---|---|---|
| 6,700,874 B1 | 3/2004 | Takihiro et al. | |
| 7,889,736 B2 | 2/2011 | Marce et al. | |
| 2006/0239238 A1* | 10/2006 | Fernandez-Corbaton et al. | 370/342 |
| 2011/0206012 A1* | 8/2011 | Youn et al. | 370/332 |

\* cited by examiner

*Primary Examiner* — Phuoc H Doan

(57) ABSTRACT

A wireless communication device exchanges data with a source base station. Based on location, velocity, and direction of the wireless communication device, an off-network transit between a source base station and a target base station is identified. The wireless communication device transfers an off-network transit request to the source base station, indicating the target base station and a time. The wireless communication device receives an off-network transit response from the source base station, indicating the target base station, a target frequency, and authorization data. The wireless communication device enters a dormant mode until the time. When the time is reached, the wireless communication device transfers authorization data to the target base station and exchanges second data with the target base station.

20 Claims, 6 Drawing Sheets

WIRELESS COMMUNICATION SYSTEM FOR DORMANT MODE DURING OFF-NETWORK TRANSIT

TECHNICAL BACKGROUND

Wireless communication devices communicate with wireless communication networks using wireless protocols, such as Long Term Evolution (LTE), Evolution Data Optimized (EVDO), Code Division Multiple Access (CDMA), Global System for Mobile communications (GSM), High Speed Packet Access (HSPA), and the like. Wireless communication networks include wireless access nodes spread over a geographic area. Each wireless access node broadcasts its signal over one or more sectors. Wireless communication devices, such as mobile phones, move throughout a geographic area. In some examples, the sectors of radio coverage for each wireless communication network may not be continuous over the geographic area. Thus, there may be holes in the radio coverage of a wireless communication network.

Users of wireless communication devices may frequently travel the same or similar routes. For example, a wireless communication device user may travel the same route between her home and office twice a day, five times a week. Wireless communication devices are used to place calls, send/receive text messaging, or access the Internet, among other activities. However, users of wireless communication devices may not use their devices while driving. When users are not using their wireless communication devices, the devices may enter a dormant mode.

Overview

A wireless communication device exchanges data with a source base station. Based on location, velocity, and direction of the wireless communication device, an off-network transit between a source base station and a target base station is identified. The wireless communication device transfers an off-network transit request to the source base station, indicating the target base station and a time. The wireless communication device receives an off-network transit response from the source base station, indicating the target base station, a target frequency, and authorization data. The wireless communication device enters a dormant mode until the time. When the time is reached, the wireless communication device transfers authorization data to the target base station and exchanges second data with the target base station.

DETAILED DESCRIPTION

Figure 1:
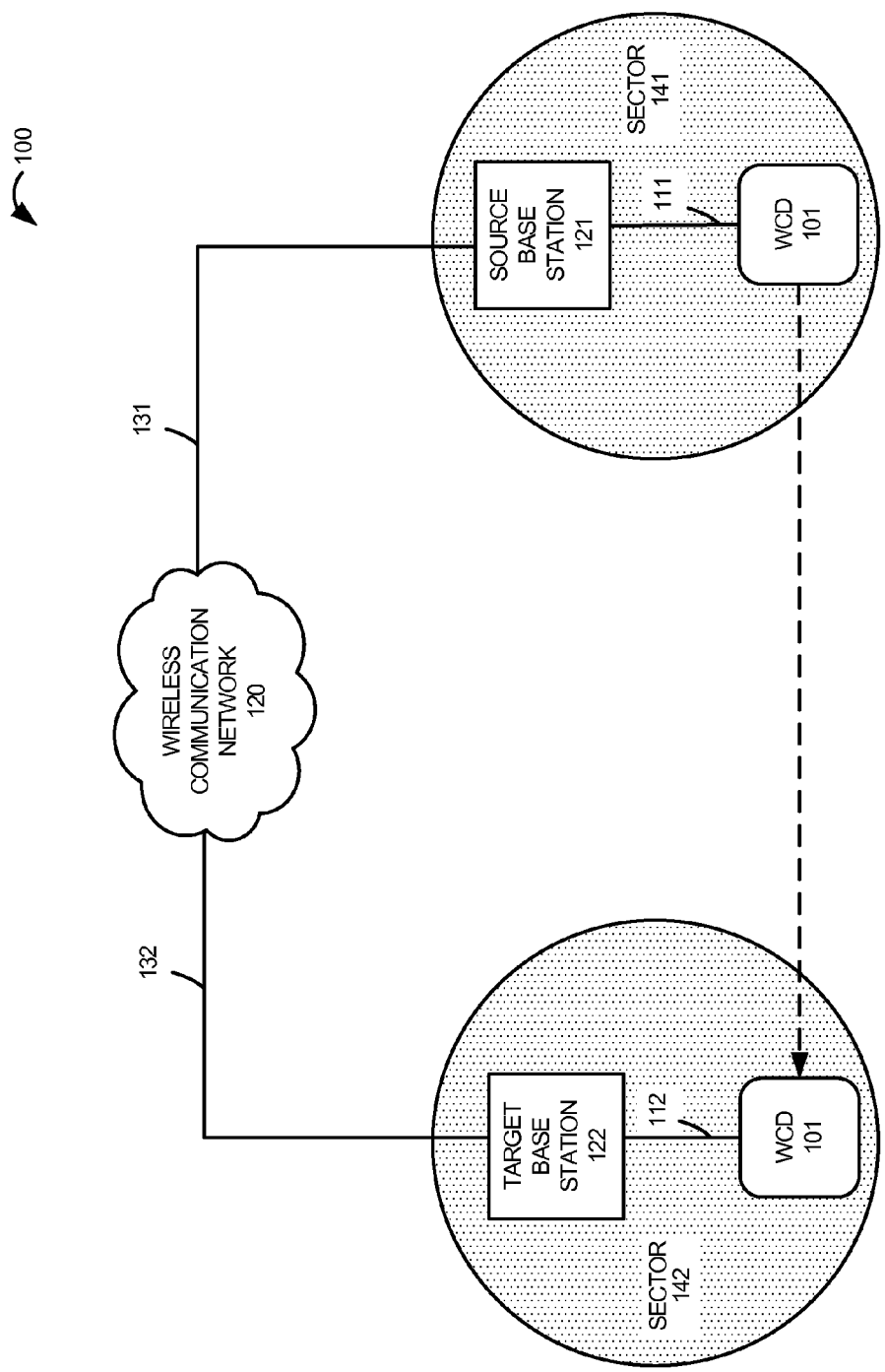
FIG. 1 illustrates a wireless communication system for dormant mode during off-network transit.

FIG. 1 illustrates wireless communication system 100 for dormant mode during off-network transit. Wireless communication system 100 includes wireless communication device 101, wireless communication network 120, source base station 121, and target base station 122. Examples of wireless communication device 101 include a telephone, cellular phone, mobile phone, smartphone, Personal Digital Assistant (PDA), laptop, computer, e-book, eReader, mobile Internet appliance, wireless network interface card, media player, game console, or some other wireless communication device with a wireless transceiver—including combinations thereof. Examples of source base station 121 and target base station 122 include a base station, eNode B, wireless hotspot, Internet access node, telephony service node, wireless data access point, or some other wireless communication system.

Wireless communication device 101 and source base station 121 communicate over wireless link 111. Wireless communication device 101 and target base station 122 communicate over wireless link 112. Source base station 121 and target base station 122 communicate with wireless communication network 120 over communication links 131 and 132, respectively. Wireless communication networks may be operated by different network operators. Source base station 121 provides wireless access to communication network 120 in sector 141. Target base station 122 provides wireless access to communication network 120 in sector 142. Sector 141 and 142 are not contiguous, thus, do not support continuous radio communication service between sectors.

In operation, wireless communication device 101 receives wireless communication services to wireless communication network 120 through source base station 121. The communication services can include voice calls, text messaging, data exchange, multimedia streaming, and the like. Based on location, velocity, and direction of wireless communication device 101, an off-network transit between source base station 121 and target base station 122 is identified. Although, FIG. 1 depicts only wireless communication network 120, wireless communication system 100 may include other wireless communication networks. In some examples, wireless communication device 101 may have access to different wireless communication networks during the off-network transit. The different wireless communication networks may have overlapping radio coverage. In other examples, wireless communication device 101 may not have access to any wireless communication network during off-network transit.

In response to identifying the off-network transit, wireless communication device 101 transfers an off-network transit request to source base station 121, indicating target base station 122 and a time. Wireless communication device 101 receives an off-network transit response from source base station 121, indicating target base station 122, a target frequency, and authorization data. Wireless communication device 101 enters a dormant mode until the time is reached. When the time is reached, wireless communication device 101 transfers authorization data to target base station 122 and exchanges second data with target base station 122.

Figure 2:
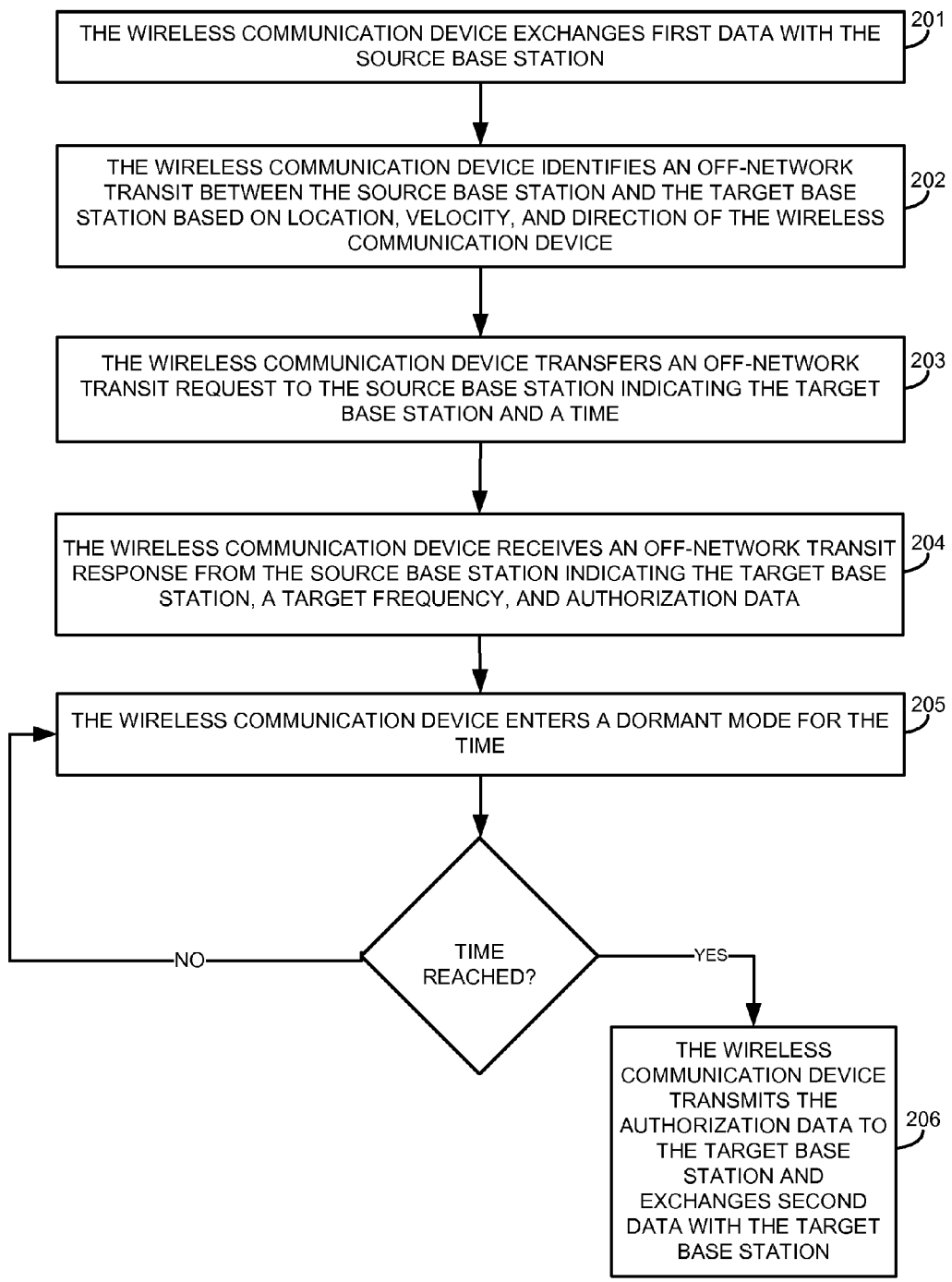
FIG. 2 illustrates the operation of the wireless communication system for dormant mode during off-network transit.

FIG. 2 illustrates the operation of wireless communication system 100 for dormant mode during off-network transit. Wireless communication device 101 exchanges first data with source base station 121 (201). Based on location, velocity, and direction of wireless communication device 101, wireless communication device 101 identifies an off-network transit between base station 121 and target base station 122 (202). Off-network transit can be determined by a positioning system of wireless communication device 101, or received as movement information provided by external position determination systems. Off-network transit may include geographic information, trajectory information, roads, streets, or other pathways previously traveled by wireless communication device 101—including combinations thereof. Off-network transit is typically determined by sensory or monitoring equipment and systems for determining a present movement, trajectory, heading, speed, momentum, or the like, of wireless communication device 101.

Wireless communication device 101 transfers an off-network transit request to source base station 121, indicating target base station 122 and a time (203). For example, wireless communication device 101 could transmit the request in a LTE uplink control channel. Source base station 121 and target base station 122 may be identified by their corresponding Base Station Identity Code (BSIC) or some other unique identifier. Wireless communication device 101 receives an off-network transit response from source base station 121, indicating target base station 122, a target frequency, and authorization data (204). For example, source base station 121 could transmit the response in a LTE downlink control channel. Examples of the target frequency include a licensed frequency band, channel size, channel ID, cell ID, sector ID, and the like. Examples of authorization data include user IDs, device IDs, and/or secure handshake, token, key, or hash result. Wireless communication device 101 enters a dormant mode for the time (205). In some examples, time refers to a specified time period, e.g. enter dormant mode for one hour. In other examples, time refers to an estimated time of arrival at target base station 122, e.g. dormant mode until 3:25 PM EST. When the specified time period has passed or the specified time is reached, wireless communication device 101 transfers authorization data to target base station 122 and exchanges second data with target base station 122 (206).

In some examples, wireless communication device may not reach the coverage area of target base station 122 after the specified time period or by the specified time. Wireless communication device 101 may not reach the coverage area of target base station 122 because of off route travel, unexpected stops, heavy traffic, among other reasons. If wireless communication device 101 is not within the coverage area of target base 122, wireless communication 101 may continue to remain in dormant mode and periodically check to determine if it is within the coverage area of target base station 122. Alternatively, wireless communication device 101 may recalculate the time to reach the coverage area of target base station 122. When the time period is reached or the specified time has passed or wireless communication 101 determines it is within the coverage area of target base station 122, wireless communication device 101 transfers authorization data to target base station 122 and exchanges second data with target base station 122. In other examples, although wireless communication device identifies off-network transit, wireless communication device 101 may not enter a dormant mode. The user of wireless communication device 101 may be the passenger rather than the driver and therefore able to use his phone to access wireless communication services. In other examples, wireless communication device 101 may exit dormant mode before the time and connect to a different wireless communication network in order to provide wireless communication services to the user. For instance, the user may need to make an emergency call.

Figure 3:
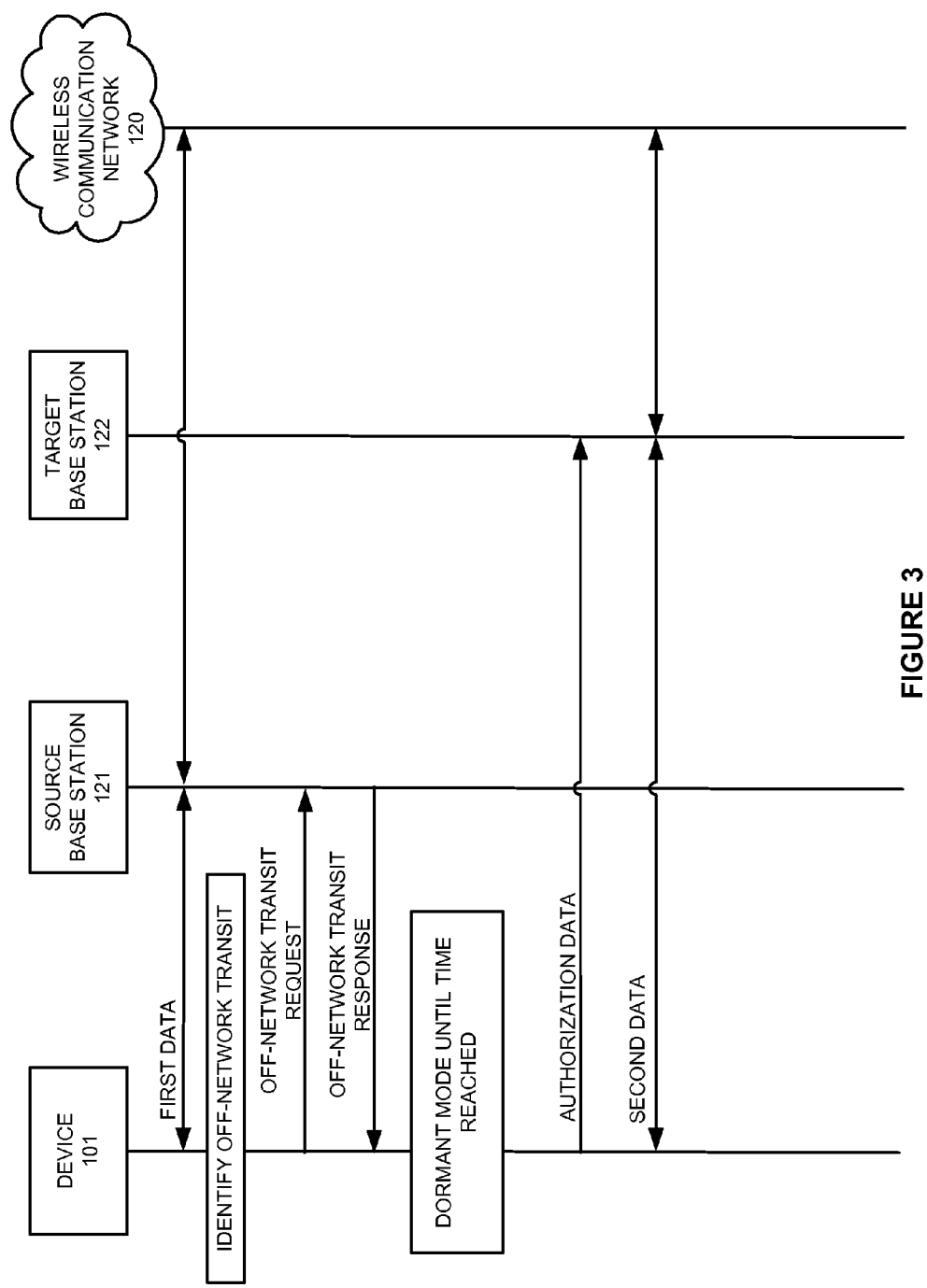
FIG. 3 illustrates the operation of the wireless communication system for dormant mode during off-network transit.

FIG. 3 illustrates the operation of wireless communication system 100 for dormant mode during off-network transit. Wireless communication device 101 exchanges first data with wireless communication network 120 via source base station 121. Based on location, velocity, and direction of wireless communication device 101, an off-network transit is identified. Although not required, off-network transit could be caused by wireless communication device 101 leaving radio coverage of wireless communication network 120, among other reasons. In response to identifying the off-network transit, wireless communication device 101 transfers an off-network request to source base station 121. The off-network request may indicate target base station 122 and a time. The off-network request may identify target base station 122 by BSIC, frequency, geographic location, or some other unique identifier. Wireless communication device 101 receives an off-network response from source base station 121 that indicates target base station 122 and a time.

Wireless communication device 101 enters a dormant mode for the time. It may be advantageous to identify times and frequently traveled routes when there is low or no exchange of communications between wireless communication device 101 and wireless communication network 120 in order to conserve battery power, avoid unnecessary handoffs, avoid roaming, among other factors—including combinations thereof. Additionally, for single mode wireless communication devices it is unnecessary to try to connect to wireless communication networks operating on a different protocol. Once the time period expires or the specified time is reached, wireless communication device 101 transmits the authorization data to target base station 122 at the target frequency, i.e. the frequency at which target base station 122 is broadcasting. Wireless communication device 101 exchanges second data with wireless communication network 120 via target base station 122. In some examples, authentication and authorization of wireless communication device 101 may be bypassed or delayed, allowing wireless communication device 101 to exchange second data with target base station 122 without waiting for authentication and/or authorization.

In some examples, wireless communication device 101 may repeatedly travel the same or similar route. Additionally, the repeated route may be traveled at approximately the same time each day or in some pattern, i.e. Monday-Friday, user of wireless communication device 101 travels between his home and office. Current and past movement of wireless communication device 101 can be determined by a positioning system of wireless communication device 101, or received as movement information provided by external position determination systems. Wireless communication device 101 may identify a repeated route based on current location, time, trajectory, velocity, among other factors—including combinations thereof.

Additionally, wireless communication system 100 may determine that there is limited or no communication between wireless communication device 101 and wireless communication network 120 when wireless communication device 101 is traveling on the repeated route. This may be determined using historical or past communications between wireless communication device 101 and wireless communication network 120. Thus, wireless communication device 101 identifies repeated transits that utilize overhead-heavy communications. For example, wireless communication device 101 may determine the ratio of overhead network communications to user data communications and then compare the ratio to a threshold to determine overhead-heavy communications.

In yet another example, wireless communication system 100 may determine that there would be at least one handoff to a different wireless communication network during the off-network transit. The geographic area or route traveled by wireless communication device 101 may have wireless communication services provided by multiple wireless communication networks. However, because there will be limited or no use of wireless communication services during the off-network transit, it is unnecessary to handoff to the different network and then handoff again back onto wireless communication network 120 once wireless communication device 101 reaches its destination.

In another example, it may be necessary or desirable for wireless communication device 101 to exit dormant mode before the specified time period has passed or the specified time is reached. The user of wireless communication device may request wireless communication services. For example, the user may need to make an emergency phone call. In other examples, the user may wish to manually turn off dormant mode during off-network transit in order to allow for use of wireless communication device 101 during off-network transit. The user may be the passenger in a vehicle and therefore desire to use wireless communication device 101 to send an email. In yet another example, it may be desirable for the network operator to turn off dormant mode during off-network transit in order to locate the user of wireless communication device 101 in case of emergency or in order to send emergency notifications, such as weather alerts, amber alerts, or other alerts to the user.

Figure 4:
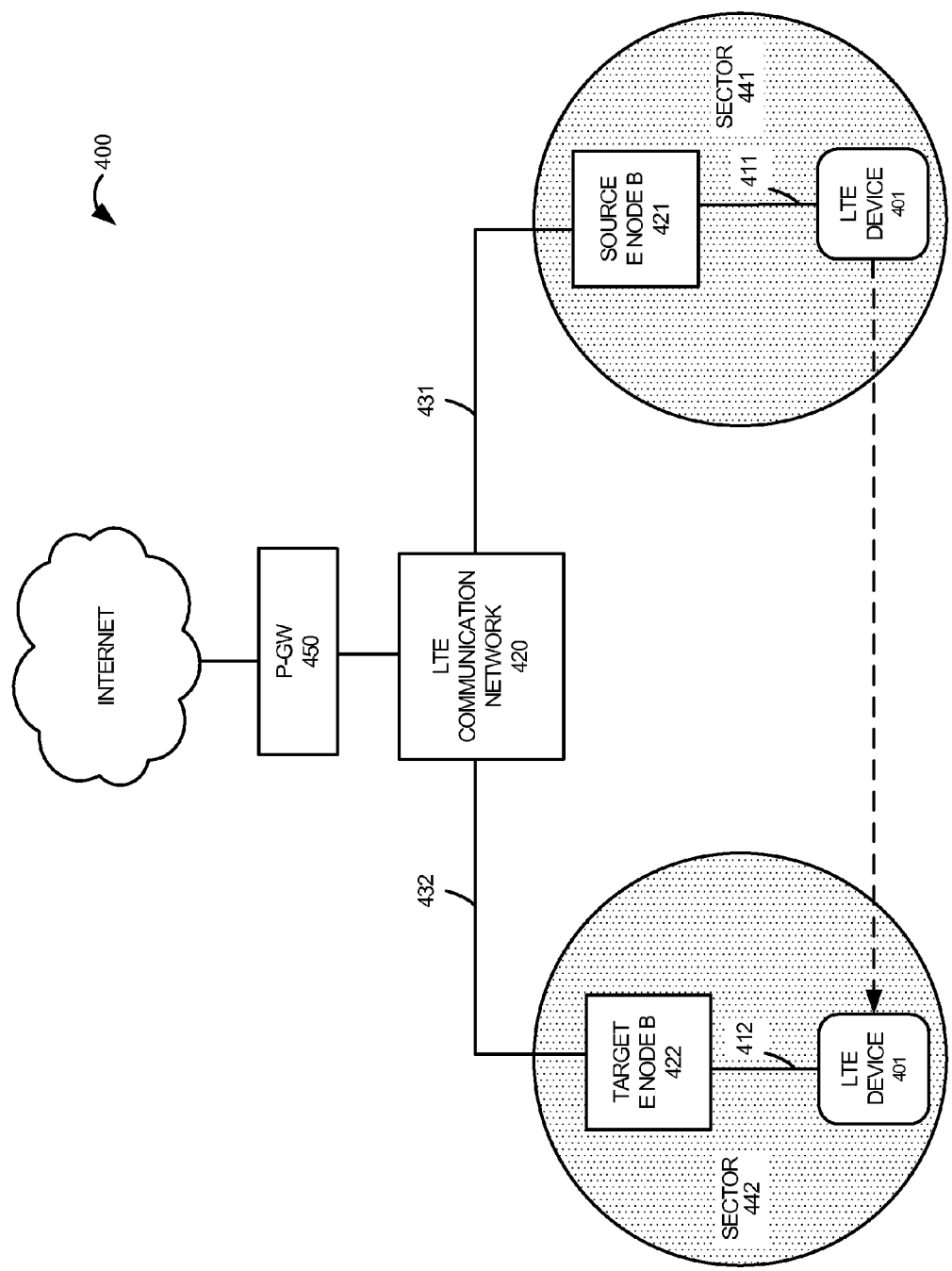
FIG. 4 illustrates a LTE wireless communication system for dormant mode during off-network transit.

FIG. 4 illustrates LTE communication system 400 to facilitate an off-network transit. LTE communication system 400 provides an example of wireless communication system 100, although wireless communication system 100 may use alternative configurations and operations. LTE communication system 400 comprises LTE communication device 401, LTE communication network 420, source eNode B 421, target eNode B 422, and P-GW 450. Source eNode B 421 provides LTE communication services in sector 441. Target eNode B 422 provides LTE communication services in sector 422. LTE device 401 communicates with source eNode B 421 and target eNode B 422 via communication links 411 and 412, respectively. Source eNode B 421 and target eNode B 422 communicate with LTE communication network 420 via communication links 431 and 432, respectively.

In operation, LTE communication device 401 receives LTE communication services from LTE communication network 420 via source eNode B 421. The communication services can include voice calls, text messaging, data exchange, multimedia streaming, and the like. While only LTE communication network 120 is shown, LTE communication system 400 and/or wireless communication system 100 may include other wireless communication networks. In some examples, LTE communication network 420 is integrated with an EVDO communication network, otherwise known as evolved High Rate Packet Data (eHRPD) system, or some other networks. In these cases, LTE communication device 401 should go dormant and not handoff to the eHRPD system or other systems.

Based on location, velocity, and direction of LTE communication device 401, an off-network transit between source eNode B 421 and target eNode B 422 is identified. In some examples, LTE communication device will display a user notice when the off-network transit is identified. Some examples of user notice include pop message, text message, email, or some other type of notification. The user will be asked to approve entering dormant mode during the off-network transit. In other examples, the user may select to turn on/off dormant mode during the off-network transit in the settings of the phone.

In response to identifying the off-network transit, LTE communication device 401 transfers an off-network transit request to source eNode B 421, indicating target eNode B 422 and a time. LTE communication device 401 receives an off-network transit response from source eNode B 421, indicating target eNode B 422, a target frequency, and authorization data. LTE communication device 401 enters a dormant mode until the specified time period is reached or the specified amount of time has passed. When the specified time period is reached or the specified amount of time has passed, LTE communication device 401 transfers authorization data to target eNode B 422 and exchanges second data with target eNode B 422.

Figure 5:
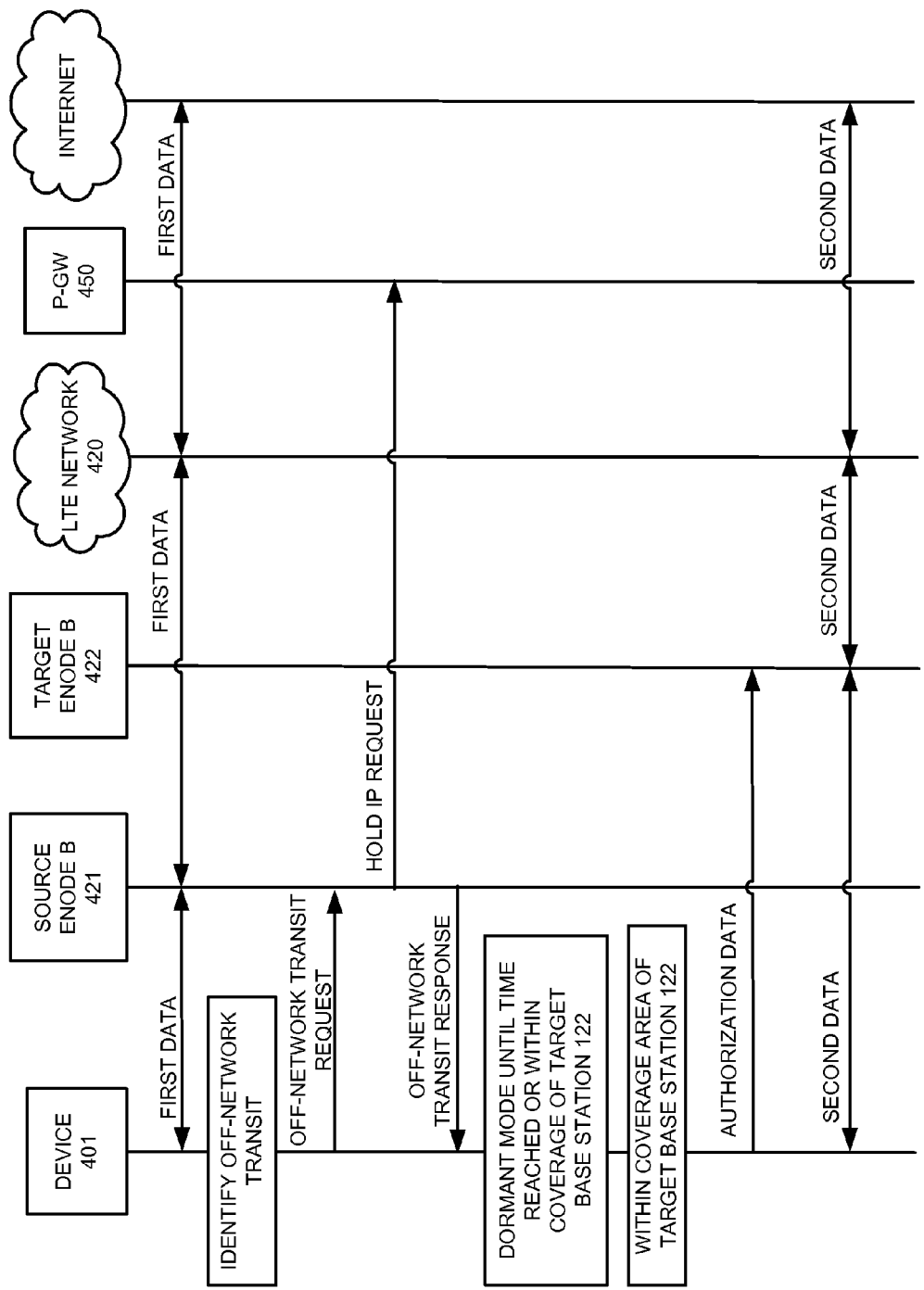
FIG. 5 illustrates the operation of the LTE wireless communication system for dormant mode during off-network transit.

FIG. 5 illustrates the operation of LTE communication system 400 for dormant mode during off-network transit. LTE communication device 401 exchanges first data with LTE communication network 420 via source eNode B 421. Based on location, velocity, and direction of LTE communication device 401, an off-network transit is identified. LTE communication device 401 leaves the radio coverage of source eNode B 421 and in not within the radio coverage of any other eNode B associated with LTE communication network 420. In response to identifying the off-network transit, LTE communication device 401 transfers an off-network request to source eNode B 421. The off-network request may indicate target eNode B 422 and a time. The off-network request may identify target eNode B 422 by BSIC, frequency, geographic location, or some other unique identifier. It may be desirable for LTE communication device 401 to retain its IP address and avoid the procedure of obtaining a new IP address. In these cases, source eNode B 421 sends a hold IP request to P-GW 450. LTE communication device 401 receives an off-network response from source eNode B 421 that indicates target eNode B 422 and a time.

LTE communication device 401 enters a dormant mode for the time. It may be advantageous to identify times and frequently traveled routes when there is low or no exchange of communications between LTE communication device 401 and LTE communication network 420 in order to conserve battery power, avoid unnecessary handoffs, avoid roaming, and/or for single mode devices. Once the time period expires or the specified time is reached, LTE communication device 401 transmits the authorization data to target eNode B 422 at the target frequency. LTE communication device 401 exchanges second data with LTE communication network 420 via target eNode B 422. Although not required, authentication and authorization of LTE communication device 401 may be bypassed or delayed, allowing LTE communication device 401 to exchange second data with target eNode B 422 without waiting for authentication and/or authorization.

Figure 6:
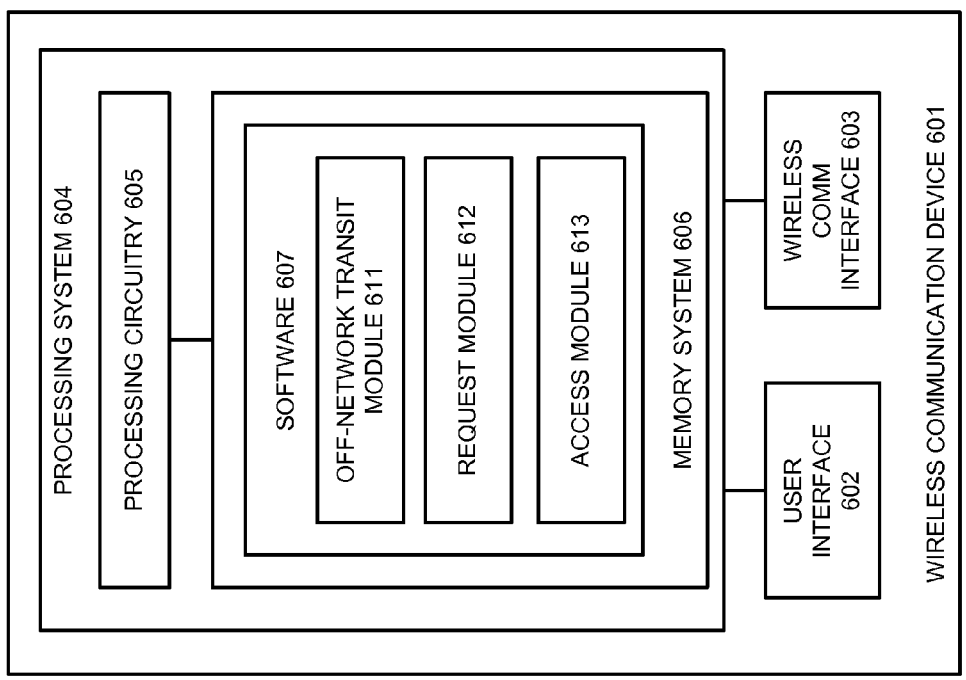
FIG. 6 illustrates a wireless communication device.

FIG. 6 illustrates wireless communication device 601 for dormant mode during off-network transit. Wireless communication device 601 provides an example of wireless communication device 101 and 401, although wireless communication device 101 and 401 could use alternative configurations. Wireless communication device 601 comprises user interface 602, wireless communication interface 603, and processing system 604. Processing system 604 is linked to user interface 602 and wireless communication interface 603. Processing system 604 includes processing circuitry 605 and memory system 606 that stores operating software 607. Wireless communication device 601 may include other well-known components such as a battery and enclosure that are not shown for clarity. Wireless communication device 601 may comprise a telephone, mobile phone, cellular phone, smartphone, computer, laptop, eReader, e-book, mobile Internet appliance, media player, game console, television, wireless network interface card, or some other wireless communication apparatus—including combinations thereof.

User interface 602 comprises components that interact with a user to receive user inputs and to present media and/or information. User interface 602 may include a speaker, microphone, buttons, lights, display screen, touch screen, touch pad, scroll wheel, keyboard, communication port, or some other user input/output apparatus—including combinations thereof. User interface 602 presents user notice of off-network transit options and receives user approval for the off-network transit as described herein.

Wireless communication interface 603 comprises RF communication circuitry and an antenna. The RF communication circuitry typically includes an amplifier, filter, RF modulator, and signal processing circuitry. Wireless communication interface 603 may also include a memory device, software, processing circuitry, or some other communication device. Wireless communication interface 603 may use various protocols, such as CDMA, GSM, HSPA, EVDO, LTE, WiMAX, WIFI, Bluetooth, Internet, telephony, or some other wireless communication format—including combinations thereof. Wireless communication interface 603 may be configured to wirelessly exchange wireless network data with a wireless network access system in a wireless communication network. Wireless communication interface 603 transmits the off-network request, receives the off-network responses, and attempts to use the target base stations as described herein.

Processing circuitry 605 comprises microprocessor and other circuitry that retrieves and executes software 607 from memory system 605. Memory system 606 comprises a disk drive, flash drive, data storage circuitry, or some other memory apparatus. Processing circuitry 605 is typically mounted on a circuit board that may also hold memory system 606 and portions of user interface 602 and wireless communication interface 603.

Software 607 includes off-network transit module 611, request module 612, and access module 613. Software 607 comprises computer programs, firmware, or some other form of machine-readable processing instructions. Software 607 may include an operating system, utilities, drivers, network interfaces, applications, or some other type of software. When executed by processing circuitry 605, software 607 directs processing system 604 to operate wireless communication device 601 as described herein for wireless communication devices 101 and 401.

In particular, off-network transit module 611 directs processing system 604 to identify off-network transit opportunities for wireless communication device 601 as described herein. Request module 612 directs processing system 604 to transfer off-network transit requests and process off-network transit responses. Access module 613 directs processing system 604 to communication with target base stations based on the off-network transit responses.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Source base station 121 and target base station 122 comprise RF communication circuitry and an antenna. The RF communication circuitry typically includes an amplifier, filter, RF modulator, and signal processing circuitry. Source base station 121 and target base station 122 may also comprise a router, server, memory device, software, processing circuitry, cabling, power supply, network communication interface, structural support, or some other communication apparatus. Source base station 121 and target base station 122 could be a base station, eNode B, wireless hotspot, Internet access node, telephony service node, wireless data access point, or some other wireless communication system—including combinations thereof.

Communication network 120 comprises network elements that provide communications services to wireless device 101 through source base station 121 and target base station 122. Communication network 120 may comprise switches, wireless access nodes, Internet routers, network gateways, application servers, computer systems, communication links, or some other type of communication equipment—including combinations thereof.

Wireless links 111-112 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 131-132 use metal, glass, air, space, or some other material as the transport media. Communication links 131-132 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 131-132 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network having a source base station and a target base station that do not have contiguous radio coverage:
   in a wireless communication device, exchanging first data with the source base station;
   in the wireless communication device, identifying an off-network transit between the source base station and the target base station based on location, velocity, and direction of the wireless communication device;
   in the wireless communication device, transferring an off-network transit request to the source base station indicating the target base station and a time;
   in the wireless communication device, receiving an off-network transit response from the source base station indicating the target base station, a target frequency, and authorization data;
   in the wireless communication device, entering a dormant mode for the time and subsequently transmitting the authorization data to the target base station at the target frequency;
   in the wireless communication device, exchanging second data with the target base station.

2. The method of claim 1 wherein identifying the off-net transit comprises identifying a repeated route traveled by the wireless communication device.

3. The method of claim 2 wherein identifying the repeated route further comprises determining that communications with the wireless communication device while the wireless communication device travels the repeated route falls below a threshold.

4. The method of claim 2 wherein identifying the repeated route further comprises determining that a ratio of overhead-to-user communications while the wireless communication device travels the repeated route exceeds a threshold.

5. The method of claim 1 further comprising displaying a user notice and receiving user approval to enter the dormant mode during the off-network transit between the source base station and the target base station.

6. The method of claim 1 comprising the source base station transferring to the target base station at least one of a target frequency, authentication and authorization information, and/or the time.

7. The method of claim 1 comprising the source base station transferring a request to hold an Internet Protocol (IP) address of the wireless communication device based on the time to a PDN-Gateway (P-GW).

8. The method of claim 1 comprising the target base station receiving the wireless communication device on the target frequency.

9. The method of claim 1 wherein exchanging second data with the target base station comprises the target base station matching the authentication and authorization information and exchanging second data between the wireless communication device and the target base station without a new authorization.

10. The method of claim 1 wherein the target base station and the source base station comprise a Long-Term Evolution (LTE) evolved Node B (eNode B) and the wireless communication device comprises an LTE communication device.

11. A wireless communication network having a source base station and a target base station that do not have contiguous radio coverage, further comprising:
a wireless communication device comprising a wireless communication interface and a processing system;
the wireless communication interface configured to exchange first data with the source base station;
the processing system configured to identify an off-network transit between the source base station and the target base station based on location, velocity, and direction of the wireless communication device;
the wireless communication interface configured to transfer an off-network transit request to the source base station indicating the target base station and a time and receive an off-network transit response from the source base station indicating the target base station, a target frequency, and authorization data; and
the wireless communication device configured to enter a dormant mode for the time;
the wireless communication interface configured to transmit the authorization data to the target base station at the target frequency; and
the processing system configured to exchange second data with the target base station.

12. The wireless communication network of claim 11 wherein the processing system is configured to identify a repeated route traveled by the wireless communication device.

13. The wireless communication network of claim 12 wherein the processing system is configured to determine that communications between the wireless communication device and the wireless communication network while the wireless communication devices travels the repeated route falls below a threshold.

14. The wireless communication network of claim 12 wherein the processing system is configured to determine that a ratio of overhead-to-user communications while the wireless communication device travels the repeated route exceeds a threshold.

15. The wireless communication network of claim 11 wherein the wireless communication device is configured to display a user notice and receive user approval to enter the dormant mode during the off-network transit between the source base station and the target base station.

16. The wireless communication network of claim 11 wherein the source base station is configured to transfer to the target base station at least one of target frequency, authentication and authorization information, and/or time.

17. The wireless communication network of claim 11 wherein the source base station is configured to transfer a request to hold an IP address of the wireless communication device for the time to a PDN-Gateway (P-GW).

18. The wireless communication network of claim 11 wherein the target base station is configured to receive the wireless communication device on the target frequency.

19. The wireless communication network of claim 11 wherein the target base station is configured to match the authentication and authorization information and exchange second data with the wireless communication device without a new authorization.

20. The wireless communication network of claim 11 wherein the target base station and the source base station comprise a Long-Term Evolution (LTE) evolved Node B (eNode B) and the wireless communication device comprises an LTE communication device.

* * * * *